May 8, 1951   M. LEVINE   2,551,955
VIEWER AND WATER SPRAYER
Filed Sept. 16, 1948
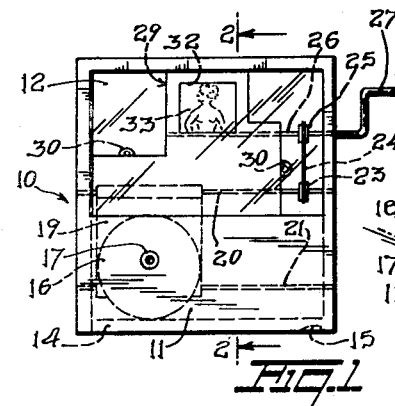
Fig. 1
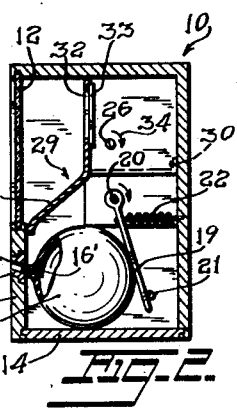
Fig. 2
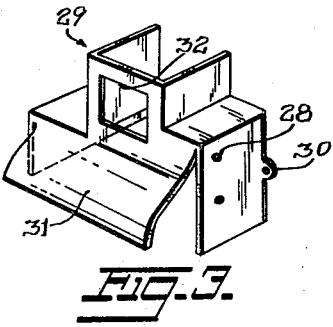
Fig. 3
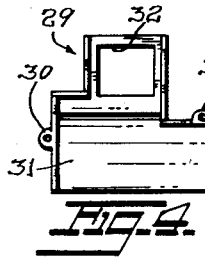
Fig. 4
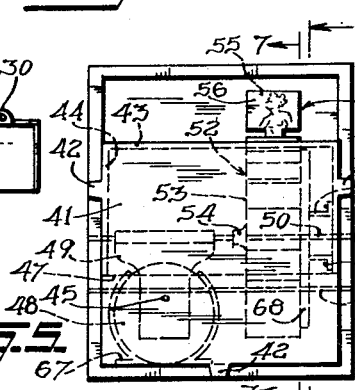
Fig. 5
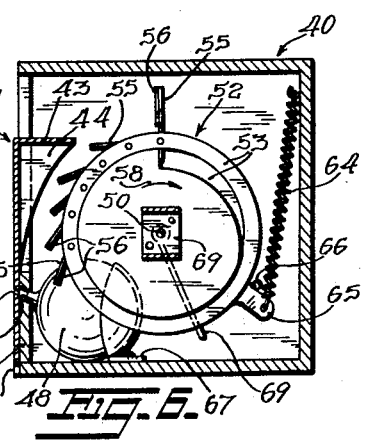
Fig. 6
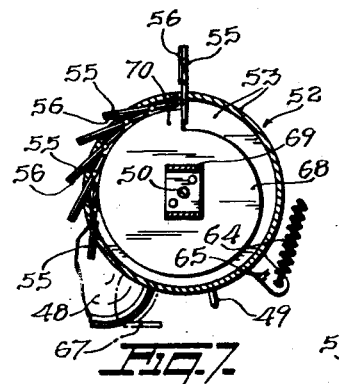
Fig. 7
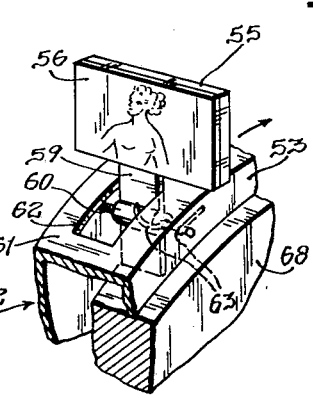
Fig. 8
Fig. 9
INVENTOR.
MORRIS LEVINE
BY
ATTORNEY Patented May 8, 1951

2,551,955

UNITED STATES PATENT OFFICE 2,551,955

VIEWER AND WATER SPRAYER

Morris Levine, Brooklyn, N. Y.

Application September 16, 1948, Serial No. 49,599

2 Claims. (Cl. 272—27)

The subject of this invention is a toy which purports to be or actually is a motion picture viewing toy which has a manual actuator, as a rotatable crank handle, the operation of which is stated to be, or actually is, for the showing of a motion picture.

In combination with the above, the invention also includes means for unexpectedly discharging a jet of water directed at the body and preferably at the face of the person operating said actuator.

According to one general way of carrying out the invention, a fixed picture only is viewable instead of the expected motion picture, while according to another way of carrying out the invention, a motion picture is actually seen, prior to the occurrence of the water discharge for causing momentary consternation to the one given the squirt of water, for thus affording amusement to all attending the incident.

More specifically, in carrying out the invention in either of the ways already mentioned, the device may incorporate a box-like or other special casing, or the casing may be simulative of some familiar utilitarian article, as a watch, a fountain pen, a pencil member of a pen and pencil set, etc., etc.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevation of the device for purportedly showing a motion picture.

Fig. 2 is a vertical section taken on the line 2—2 of Fig. 1.

Fig. 3 is a frontal perspective view of a hood.

Fig. 4 shows said hood in rear elevation.

Fig. 5 illustrates in front elevation another embodiment of the invention for actually showing a motion picture.

Fig. 6 is a vertical section taken on the line 6—6 of Fig. 5.

Fig. 7 is a fragmentary vertical section taken on the line 7—7 of Fig. 5.

Fig. 8 is an enlarged fragmentary perspective view, showing details of construction of each of several picture-carrying swing blades for being successively brought to a view station.

Fig. 9 is an enlarged perspective view of a bulb pocketing stall.

Referring to the drawings more in detail, and first to Figs. 1-4, the structure here shown includes a box-like casing 10 permanently closed by a rear wall, a top wall and two side walls and permanently closed at its front lower portion by a wall 11, to provide a front opening which may be covered by a glass or transparent plastic pane 12. The bottom of the casing has slidable therewithin, a wall member 14, which may be provided with a finger-nail-engaging recess 15 to facilitate removal of the member 14, as for the purpose of inserting a bulb 16 after the latter has been filled with water.

Bulb 16 has a neck 16′ surrounding a discharge orifice; and a tubular thimble 17 is set in the front wall 11, so that the neck of the bulb may be inserted within the bore through said thimble, as shown in Fig. 2, in which view an arrangement of the parts is illustrated whereby the jet or squirt 18 of discharged water will be upwardly directed.

For acting on the bulb 16 to compress the same for effecting said water discharge, a plate 19 is fixed on a shaft 20 journalled at opposite ends in the two side walls of the casing; said plate being normally maintained as shown, against a crossrod stop 21, by a spring 22. Fixed on the shaft 20 is a sprocket 23, connected by a chain 24 with a similar sprocket 25 fixed on a shaft 26 extended at one end through a suitable aperture in a side wall of the casing, beyond which wall said shaft is bent to provide a crank handle 27.

The opposite end of the shaft 26 is journalled in an aperture 28 in a shell-like hood 29, which may be stamped from thin sheet metal. The hood 29 includes spaced tabs 30 lying in the plane of the wholly open rear of the hood, whereby nails, tacks or the like may be used for mounting the head in the casing 10 as shown for apparently constituting the housing for the working parts of an actual miniature motion picture machine. It will be noted that said hood has a front wide eave-like skirt 31 to hide the bulb 16 and the plate 19, and that at the top formation of the hood the front wall thereof has an opening 32. Displayed through said opening is a suitable picture 33, which may be explained to the culprit as the first "frame" of the series of pictures or frames to be successively exhibited at the window 32 to "run off" the motion picture.

According to this arrangement, the subject of the joke, with the casing 10 held by him as he naturally would hold it, that is, with its front close to his face and with his eyes directed at the opening 32, is subjected to the water jet 18 substantially simultaneously with the initiation by him of a rotational movement of the crank handle 27 to turn the same in the direction he has been cautioned it must be turned, that is, in the direction of the arrow 34 of Fig. 2.

Referring to Figs. 5-9, the structure here shown includes a box-like casing 40 permanently closed by top, bottom and rear walls and two side walls. The major and lower portion of the open front of the casing is closed by a removable hood 41, which may be stamped from thin sheet metal and which includes a main face plate provided with a plurality of projected tabs 42 for abutting the front edges of the casing 10 to the bottom and side walls thereof as shown. Across its top said hood has a portion bent horizontally to provide an inturned top flange 43 for hiding parts therebelow, and two similar, slightly outwardly sprung side webs like the one shown at 44 in Fig. 6.

The face plate of the hood 41 has an aperture 45, positioned to lie at the outer end of a channel 46 through a low panel 47 fixed in position across the front of the casing, said channel having inserted therein the discharge neck of a water-containing bulb 48.

For acting on the bulb 48 to compress the same thereby to discharge a water jet through the orifice afforded by the aperture 45, a plate 49 is fixed on a shaft 50 journalled in the two side walls of the casing, such shaft being extended at one end beyond the casing and there bent to provide a crank handle 51.

Fixed on the shaft 50 is a hollow drum 52 open at one side to establish an inturned circumferential flange 53; the drum being non-wobbly secured to the shaft 50 by means of a neck 54, integral with the drum.

Pivotally mounted on the drum 52 are a plurality of swing-blades 55, each for carrying a picture 56. In Figs. 6 and 7 merely six such swing-blades are shown. More or less than six of these may, of course, be provided. As will be understood, the pictures of the different blades will be successively brought to the view station (57, Fig. 5), upon turning the handle 51 in the direction of the arrow 58 of Fig. 6, and each will represent a slightly changed attitude of the figure or figures common to all the pictures, whereby the illusion of a figure or figures in actual movement will be presented in accordance with the persistence-of-vision principle which is the basis of all motion pictures.

As shown best in Fig. 8, in the case of the swing-blade 55 there shown, each swing-blade has a depending reduced extension 59, fixed on a pin-shaft 60 journalled at its opposite ends at the closed side of the drum and at the drum flange 53. Cut through the peripheral flange 61 of the drum is an elongate slot 62, to allow rocking of the swing-blade, for erection thereof radially of the drum, under impulse of a torsion spring 63. In Figs. 4–8, one swing-blade 55, that at the aforesaid view station 57, is thus erect, while all the other blades 55 are arranged as shown in Figs. 6 and 7.

This is the situation when the subject of the joke is handed the device, for the viewing by him of a motion picture. Then the drum 52 is held as shown in Fig. 6 by a spring 64 connected to a finger 65 suitably carried by the drum. Spring 64 urges said finger against a cross-pin stop 66. Also at this time the plate 49, being fixed on the shaft 50, is in a position at some distance to the rear of the bulb 48 which is pocketed by a stall 67 formed, as shown best in Fig. 9, from thin sheet metal.

For successively displaying the pictures 56 on the swing-blades 55, at the aforesaid view station 57, a fixed cam 68 is secured in position, inside the drum 52, by a U-bracket 69.

Thus, as the handle 51 is turned in the direction of the arrow 58 of Fig. 6, a plurality of pictures 56 will be successively brought to the view station 57; each picture being thus displayed consequent upon passage of that portion of its carrying plate 55 corresponding to the reduced extension 59 of the plate 55 of Fig. 8, fully beyond the cam drop 70. While this is occurring, the subject of the joke will naturally be holding the casing 40 with its front close to his face, and with his eyes directed at the view station. As the motion picture exhibition nears its close, the plate 49 compresses the bulb 48, and the water jet is discharged.

As has been said hereinabove, the device of the invention may incorporate a casing or holder simulative of some familiar utilitarian article such as a watch, a fountain pen, or the pencil member of a pen and pencil set. There are many other articles which may be thus simulated, such as a pair of opera glasses or binoculars, a telescope, dolls of various kinds, or indeed any toy or other article.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a novelty toy device having a box including a plurality of substantially superimposed openings in one wall thereof with a crank projected through another wall and a compressible water container having discharge neck anchored within the box with the neck positioned to discharge through one of the openings, a hollow drum having a peripheral flange rigidly secured to the crank within the box and behind the other of the openings, pictures hinged to said flange to be viewed through the other of the openings as the drum rotates with the crank, said pictures including portions projected to the interior of the hollow drum, a cam within said hollow drum and fixed to a wall of the box, said cam having notch therein, and a plate secured to the crank immediately to the rear of the water container for compressing the same as the crank is turned, whereby rotation of the crank will cause rotation of said hollow drum relative to said cam causing said pictures to come to view through the other of the openings in the box through coaction of said depending portions and the notch in said cam and cause compression of the water container by said plate to discharge contained water through the neck and the said one opening.

2. A novelty toy device as defined in claim 1 wherein said hollow drum has attached thereto a resilient means affixed to one of the walls of the box to return said hollow drum and said pictures to their original positions after rotation of said hollow drum.

MORRIS LEVINE.

REFERENCES CITED

The following references are of record in the file of this patent:

UNITED STATES PATENTS

| Number | Name | Date |
|---|---|---|
| 1,560,909 | Gill | Nov. 10, 1925 |
| 2,513,506 | Mendelson | July 4, 1950 |

FOREIGN PATENTS

| Number | Country | Date |
|---|---|---|
| 58,495 | Austria | Nov. 15, 1912 |